US008582777B2

(12) United States Patent
Urivskiy et al.

(10) Patent No.: US 8,582,777 B2
(45) Date of Patent: Nov. 12, 2013

(54) METHOD AND SYSTEM FOR LIGHTWEIGHT KEY DISTRIBUTION IN A WIRELESS NETWORK

(75) Inventors: Alexey V. Urivskiy, Moscow (RU); Andrey L. Chmora, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 1297 days.

(21) Appl. No.: 11/790,987

(22) Filed: Apr. 30, 2007

(65) Prior Publication Data

US 2007/0260878 A1  Nov. 8, 2007

(30) Foreign Application Priority Data

May 3, 2006  (RU) ................................. 2006114900
Dec. 13, 2006  (KR) ......................... 10-2006-0127313

(51) Int. Cl.
*H04L 9/08* (2006.01)
*H04L 9/14* (2006.01)
*H04L 9/28* (2006.01)

(52) U.S. Cl.
CPC .............. *H04L 9/0838* (2013.01); *H04L 9/0833* (2013.01); *H04L 9/0819* (2013.01)
USPC ............ 380/278; 380/277; 380/281; 380/283

(58) Field of Classification Search
CPC .................................................. H04L 9/0838
USPC ........................................... 713/163; 380/278
See application file for complete search history.

(56) References Cited

U.S. PATENT DOCUMENTS

| 2003/0147537 A1* | 8/2003 | Jing et al. ...................... 380/277 |
| 2004/0179686 A1* | 9/2004 | Matsumura et al. ............ 380/44 |
| 2005/0050004 A1* | 3/2005 | Sheu et al. ........................ 707/1 |
| 2005/0078678 A1* | 4/2005 | Kim et al. ...................... 370/390 |
| 2005/0140964 A1* | 6/2005 | Eschenauer et al. ............ 356/10 |
| 2006/0010203 A1* | 1/2006 | Mrsic-Flogel et al. ........ 709/205 |
| 2007/0015498 A1* | 1/2007 | Giacalone et al. ............. 455/418 |
| 2007/0078817 A1* | 4/2007 | Girao et al. ....................... 707/2 |
| 2007/0094494 A1* | 4/2007 | Banerjee et al. ............... 713/157 |

* cited by examiner

*Primary Examiner* — Ashok Patel
*Assistant Examiner* — Alexander Lagor
(74) *Attorney, Agent, or Firm* — NSIP Law

(57) ABSTRACT

A method and system for lightweight key distribution in a wireless network comprises calculating a second intermediate value using a first intermediate value which corresponds to respective partial keys included in a key pool; generating an encryption key using the second intermediate value and encrypting a partial key corresponding to a key index in common with a new node with the encryption key; and sending a key part which contains the encrypted partial key and the second intermediate value. Therefore, if a new node joins the wireless network, the key set can be allocated to the new node using its ID while the key sets allocated to the existing nodes of the network are retained.

18 Claims, 2 Drawing Sheets

METHOD AND SYSTEM FOR LIGHTWEIGHT KEY DISTRIBUTION IN A WIRELESS NETWORK

CROSS-REFERENCE TO RELATED APPLICATIONS

This application claims the benefit under 35 U.S.C. §119(a) of Korean Patent Application No. 2006-127313, filed on Dec. 13, 2006, in the Korean Intellectual Property Office (KIPO), and Russian Patent Application No. 2006114900, filed on May 3, 2006, in the Russian Federal Service for Intellectual Property, Patents and Trademarks (ROSPATENT), the entire disclosures of which are hereby incorporated by reference.

BACKGROUND OF THE INVENTION

1. Field of the Invention

The following description relates to a method and system for lightweight key distribution in a wireless network. More particularly, the following description relates to a method and system for lightweight key distribution in a wireless network wherein if a new node joins the wireless network, the key set can be allocated to the new node using its ID while the key sets allocated to the existing nodes of the network are retained.

2. Description of the Related Art

The nodes of a wireless network set secure keys in order to transmit and receive data safely against attack of a third party. By transmitting the encrypted data using secure keys, the nodes are able to transmit and receive data safely from the attack of the third party.

The following explanation describes a conventional method for the nodes of a wireless network to set a secure key when a new node joins the wireless network.

Typically, when a new node intends to join the network, the conventional wireless network resets the secure keys of the nodes of the wireless network as well as the new node and allocates the secure keys to the new node and the existing nodes of the wireless network.

However, in a case where a new node joins as a network member, the conventional secure key distribution method in the wireless network needs to reset and distribute the secure keys of all of the network members, thus increasing the computation and transmission times of the secure key.

Accordingly, there is a need for an improved method and system for lightweight key distribution in a wireless network wherein if a new node joins the wireless network, the key set can be allocated to the new node using its ID while the key sets allocated to the existing nodes of the network are retained, thus, decreasing the computation and transmission times of the secure key.

SUMMARY OF THE INVENTION

Examples described herein address at least the above problems and/or disadvantages and may provide at least the features and aspects described below. Accordingly, general aspects may provide a lightweight key distribution in a wireless network which distributes a secure key to a new node using an identification (ID) of the new node when the new node intends to join the wireless network.

In one general aspect, there is provided a lightweight key distribution method which includes calculating a second intermediate value using a first intermediate value which corresponds to respective partial keys included in a key pool; generating an encryption key using the second intermediate value and encrypting a partial key corresponding to a key index in common with a new node with the encryption key; and sending a key part which contains the encrypted partial key and the second intermediate value.

The lightweight key distribution method may further include generating a session key. The calculating operation may calculate the second intermediate value by applying a first concatenated value, which is acquired by concatenating the session key and the first intermediate value, to a hash function.

The generating operation may include receiving a key request message which contains an identification (ID) of a new node and a certificate used to verify the ID; generating the session key when the verification of the new node using the certificate is successful; and broadcasting the ID, the certificate, and the session key.

The encrypting operation may include extracting a key index in common with a key index of the new node; generating the encryption key by applying a second concatenated value, which is acquired by concatenating the second intermediate value corresponding to the common key index, to a hash function; and encrypting a partial key corresponding to the common key index with the encryption key.

The first intermediate value may be generated using either a hash function or a random function.

According to another aspect, a key acquisition method includes receiving at least one key part which contains a second intermediate value which is generated based on a first intermediate value corresponding to respective partial keys included in a key pool, and an encrypted partial key; generating a decryption key using the second intermediate value; and decrypting the encrypted partial key with the decryption key.

The receiving operation may receive the at least one key part corresponding to a key index. The generating operation may generate the decryption key by applying a second concatenated value, which is acquired by concatenating the second intermediate value in the respective key parts, to a hash function.

According to another aspect, there is provided a system for lightweight key distribution in a wireless network, the system including network nodes for calculating a second intermediate value using a first intermediate value which corresponds to respective partial keys included in a key pool; generating an encryption key using the second intermediate value and encrypting a partial key corresponding to a key index in common with a new node with the encryption key; and sending a key part which contains the encrypted partial key and the second intermediate value.

The system for lightweight key distribution in a wireless network may further include a network node for generating a session key. The calculating operation may include a network node for calculating the second intermediate value by applying a first concatenated value, which is acquired by concatenating the session key and the first intermediate value, to a hash function.

The generating operation may include network nodes for receiving a key request message which contains an identification (ID) of a new node and a certificate used to verify the ID; generating the session key when the verification of the new node using the certificate is successful; and broadcasting the ID, the certificate, and the session key.

The encrypting operation may include network nodes for extracting a key index in common with a key index of the new node; generating the encryption key by applying a second concatenated value, which is acquired by concatenating the second intermediate value corresponding to the common key index, to a hash function; and encrypting a partial key corresponding to the common key index with the encryption key.

The first intermediate value may be generated using either a hash function or a random function.

According to another aspect, there is provided a system for key acquisition in a wireless network, the system including network nodes for at least one key part which contains a second intermediate value which is generated based on a first intermediate value corresponding to respective partial keys included in a key pool, and an encrypted partial key; generating a decryption key using the second intermediate value; and decrypting the encrypted partial key with the decryption key.

The receiving operation may include a network node for receiving the at least one key part corresponding to a key index. The generating operation may include a network node for generating the decryption key by applying a second concatenated value, which is acquired by concatenating the second intermediate value in the respective key parts, to a hash function.

BRIEF DESCRIPTION OF THE DRAWINGS

The above and other aspects and features will be more apparent from the following description taken in conjunction with the accompanying drawing, in which.

Throughout the drawings, the same drawing reference numerals will be understood to refer to the same elements, features and structures

DETAILED DESCRIPTION

The matters defined in the description such as a detailed construction and elements are provided to assist in a comprehensive understanding of examples described herein. Accordingly, those of ordinary skill in the art will recognize that various changes and modifications can be made without departing from the scope and spirit of the examples described herein. Also, descriptions of well-known functions and constructions are omitted for clarity and conciseness.

Prior to explanations on an example of a lightweight key distribution method, it is assumed that once a network node knows an ID of another node, it knows a key index allocated to the other node. Reference will now be made in detail to general aspects, examples of which are illustrated in the accompanying drawings.

Figure 1:
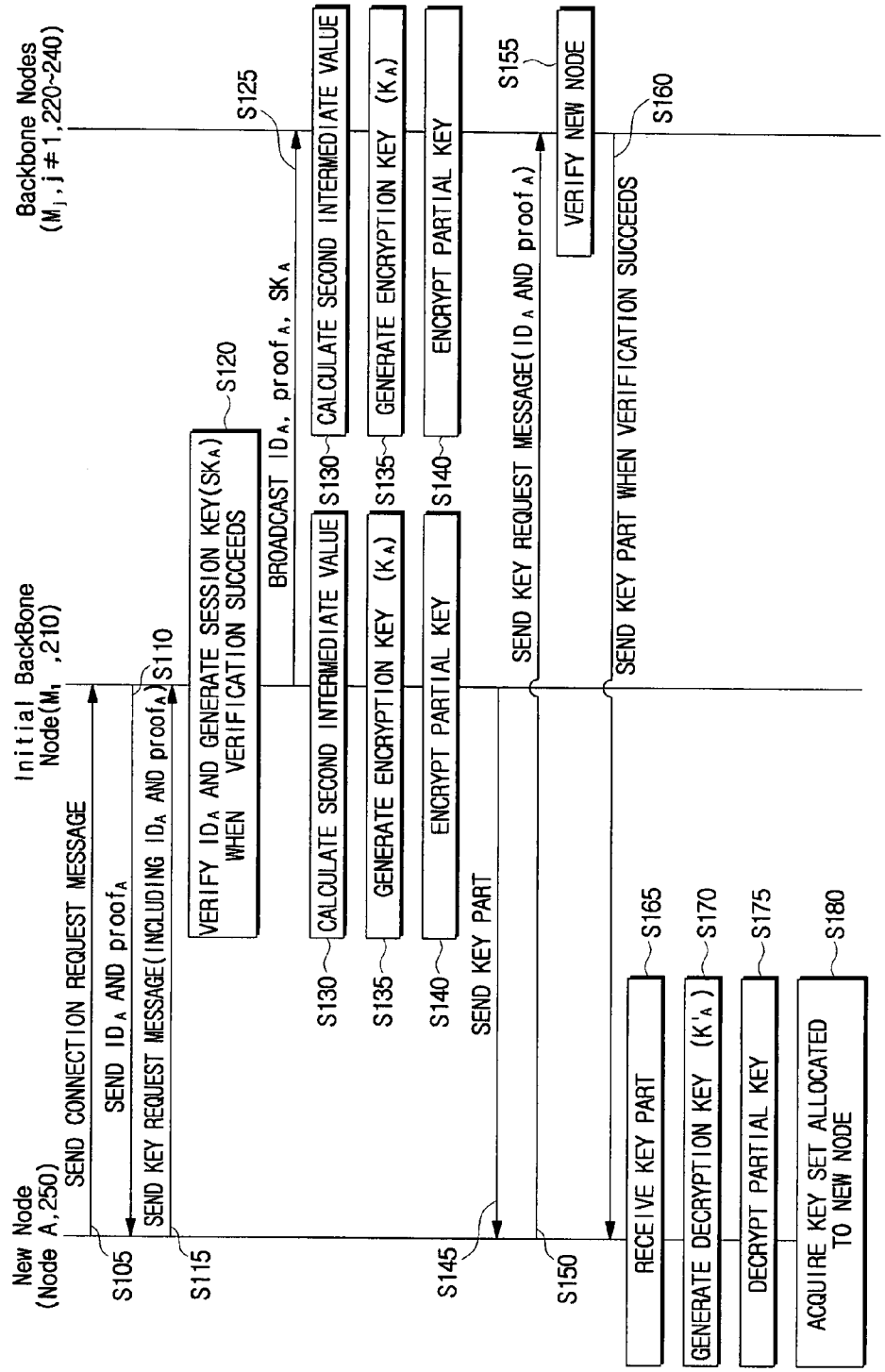
FIG. 1 is a flowchart outlining an example of a lightweight key distribution scheme.
Figure 2:
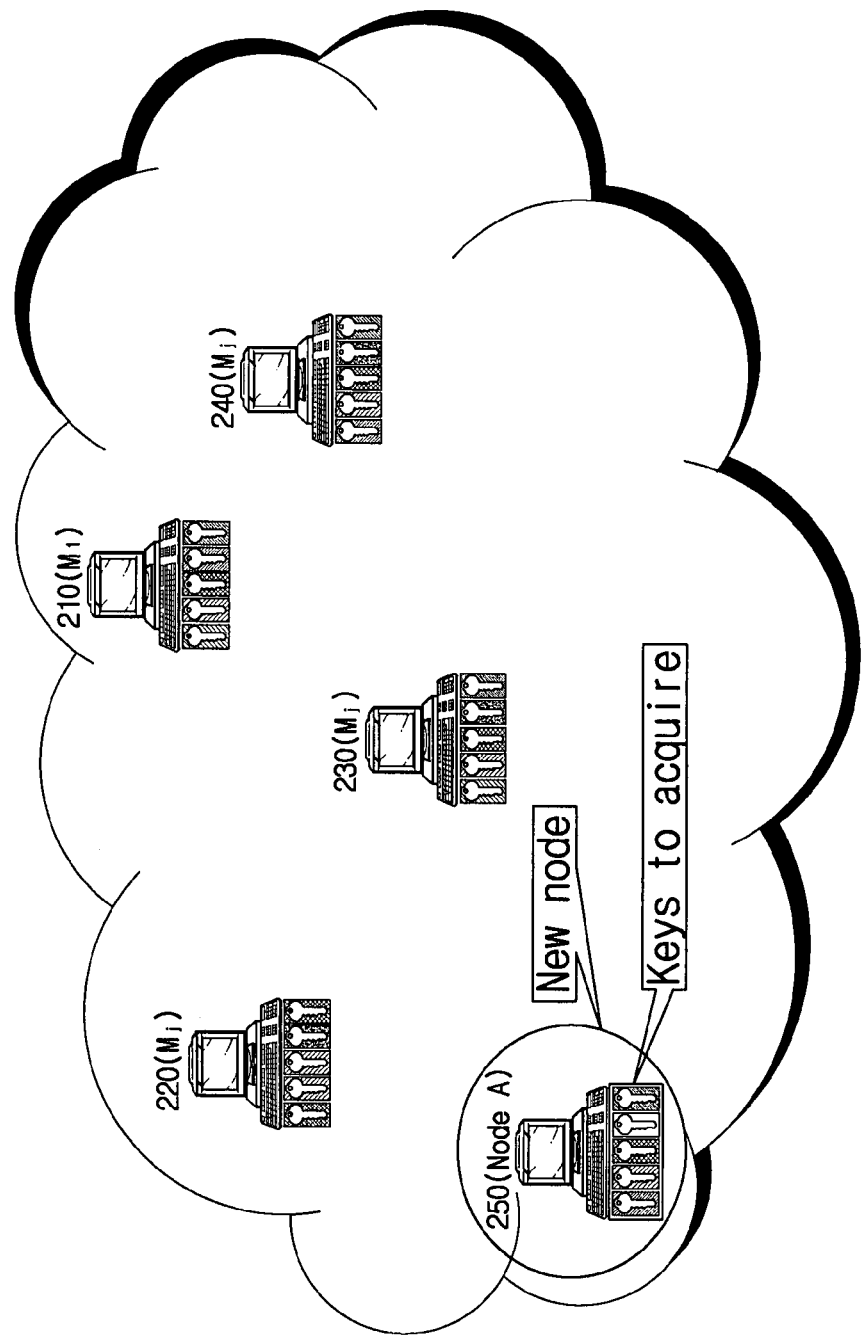
FIG. 2 depicts an example of a network to which the lightweight key distribution scheme is applied.

FIG. 1 is a flowchart outlining an example of a lightweight key distribution scheme, and FIG. 2 depicts an example network to which the lightweight key distribution method is applied.

Referring to FIGS. 1 and 2, a new node A 250 sends a connection request message to an initial backbone node $M_1$ 210 of backbone nodes $M_j$ (j is constant and j≠1) 220 through 240 (S105). The initial backbone node $M_1$ 210 and the backbone nodes $M_j$ 220 through 240 are requisite members for the initial network formation.

Next, the initial backbone node $M_1$ 210 sends to the new node A 250 an ID $ID_A$ to be allocated to the new node A 250 and a certificate $Proof_A$ to verify the ID (S110). An example of the certificate $Proof_A$, which is used to verify the ID allocated to the new node, includes a digital signature.

Upon receiving its ID $ID_A$ and certificate $Proof_A$, the new node A 250 sends a key request message to the initial backbone node $M_1$ 210 (S115). The key request message contains the ID $ID_A$ and the certificate $Proof_A$ of the new node A 250. Referring now to FIG. 2, the new node A 250 transmits the key request message to the initial backbone node $M_1$ 210 to acquire keys corresponding to its key index.

The initial backbone node $M_1$ 210 verifies the ID $ID_A$ of the new node A 250 using the certificate $Proof_A$ received from the new node A 250 (S120). If the verification of the ID $ID_A$ of the new node is successful, the initial backbone node $M_1$ 210 generates a session key $SK_A$. If the ID verification fails, the initial backbone node $M_1$ 210 discards the ID $ID_A$ and the certificate $Proof_A$ of the new node A 250. The ID verification method using a certificate is a well-known technique in the art and thus its detailed explanation shall be omitted for brevity.

Next, the initial backbone node $M_1$ 210 broadcasts the generated session key $SK_A$, the ID $ID_A$, and the certificate $Proof_A$ of the new node A 250 to the backbone nodes $M_j$ 220 through 240 (S125). Particularly, in a secure channel, the initial backbone node $M_1$ 210 broadcasts the session key $SK_A$, the ID $ID_A$, and the certificate $Proof_A$ of the new node A 250 to the backbone nodes $M_j$ 220 through 240.

The initial backbone node $M_1$ 210 and the backbone nodes $M_j$ 220 through 240 calculate a second intermediate value $\hat{S}_i$ using the session key $SK_A$ and a first intermediate value $S_i$ (S130). The first intermediate value $S_i$ corresponds respectively to partial keys $K_i$ included in a key pool. Every node in the network can generate the first intermediate value $S_i$ corresponding to the allocated partial key $K_i$ using a specific function. The specific function applied to generate the first intermediate value $S_i$ may be a hash function or a random function, but is not limited to these functions.

Particularly, the initial backbone node $M_1$ 210 and the backbone nodes $M_j$ 220 through 240 calculate the second intermediate value $\hat{S}_i$ by applying a first concatenated value $S_i \| SK_A$, which is acquired by concatenating the session key $SK_A$ and the first intermediate value $S_i$, to the hash function H. After receiving the session key $SK_A$, the ID $ID_A$, and the certificate $Proof_A$ of the new node A 250 from the initial backbone node $M_1$ 210 (S125), the backbone nodes $M_j$ 220 through 240 calculate the second intermediate value $\hat{S}_i$. The second intermediate value $\hat{S}_i$ is calculated based on Equation 1 as shown below.

$$\hat{S}_i = H(S_i \| SK_A) \qquad \text{[Equation 1]}$$

In Equation 1, $\hat{S}_i$ is the second intermediate value, $S_i$ is the first intermediate value, $SK_A$ is the session key, and H is the hash function. The hash function in Equation 1 may be a one-way hash function.

The one-way hash function transforms an input value of an arbitrary length to a fixed-length output value. The one-way hash function has the following properties: it is impossible to calculate an original input value with a given output value, it is impossible to find an output value with a given input value or to find another input value, and it is impossible to find and calculate two different input values that produce the same output value. The hash function characterized by the above features may be used in functions applied for data integrity, authentication, repudiation prevention, and the like.

Next, the initial backbone node $M_1$ 210 and the backbone nodes $M_j$ 220 through 240 generate an encryption key $K_A$ using the second intermediate value $\hat{S}_i$ and the key index $I_A$ of the new node A 250 (S135). The encryption key $K_A$ is generated based on Equation 2. Since the initial backbone node $M_1$ 210 and the backbone nodes $M_j$ 220 through 240 already know the ID $ID_A$ of the new node A 250, they are also aware of the key index $I_A$ of the keys allocated to the new node A 250.

$$K_A = H\left(\underset{i \in I_A}{\|} \hat{S}_i\right) \quad \text{[Equation 2]}$$

In Equation 2, $K_A$ is the encryption key, $I_A$ is the key index of the new node A 250, $\hat{S}_i$ is the second intermediate value, and H is the hash function.

More specifically, assuming that the key index $I_A$ of the new node A 250 is $\{2,3,5\}$, the initial backbone node $M_1$ 210 and the backbone nodes $M_j$ 220 through 240 generate the second intermediate value $\{\hat{S}_2=H(S_2\|SK_A), \hat{S}_3=H(S_3\|SK_A), \hat{S}_5=H(S_5\|SK_A)\}$ using the first intermediate value $\{S_2, S_3, S_5\}$ corresponding to the key index $I_A$ of the new node A 250, respectively (S130).

The second intermediate value, like the first intermediate value, is generated to correspond to the key index $I_A$ of the new node A 250. The initial backbone node $M_1$ 210 and the backbone nodes $M_j$ 220 through 240 generate the encryption key $K_A$ by substituting the second concatenated value $\hat{S}_2\|\hat{S}_3\|\hat{S}_5$, which is acquired by concatenating the second intermediate value $\{\hat{S}_2, \hat{S}_3, \hat{S}_5\}$, to the hash function H.

Next, the initial backbone node $M_1$ 210 and the backbone nodes $M_j$ 220 through 240 respectively extract a key index in common with the key index $I_A=\{2,3,5\}$ of the new node A 250 from their key indexes and encrypt a partial key $k_i$ corresponding to the extracted key index with the encryption key $K_A$ (S140).

Assuming that the key index $I_A$ of the new node A 250 is $\{2,3,5\}$ and the key index of the initial backbone node $M_1$ 210 is $\{3,5,6\}$, the initial backbone node $M_1$ 210 extracts a common key index $BI_{M_1} \cap I_A = \{3,5\}$ from its key index and the key index of the new node A 250, and encrypts partial keys $k_3$ and $k_5$ corresponding to the extracted common key index with the encryption key $K_A$.

Next, the initial backbone node $M_1$ 210 sends a key part $P_1$, corresponding to the common key index, to the new node A 250 (S145). Herein, the key part $P_1$ includes the encrypted partial key $E_{K_A}(k_i)$ and the second intermediate value $\hat{S}_i$ corresponding to the common key index. Specifically, the initial backbone node $M_1$ 210 sends to the new node A 250 the key part $P_1$, which contains the encrypted partial keys $E_{K_A}(k_3)$ and $E_{K_A}(k_5)$, and the second intermediate value $\{\hat{S}_3, \hat{S}_5\}$. The key part $P_1$ transmitted by the initial backbone node $M_1$ 210 is expressed as Equation 3.

$$P_1 = \{E_{K_A}(k_i), \hat{S}_i, i \in I_{M_1} \cap I_A\} \quad \text{[Equation 3]}$$

In Equation 3, $P_1$ is the key part transmitted from the initial backbone node $M_1$ 210, $E_{K_A}(k_i)$ is the encrypted key of the partial keys corresponding to the common key index of the initial backbone node $M_1$ 210 and the new node A 250, and $\hat{S}_i$ is the second intermediate value corresponding to the common key index of the initial backbone node $M_1$ 210 and the new node A 250.

Next, upon receiving the key part $P_1$ from the initial backbone node $M_1$ 210, the new node A 250 sends a key request message to one of the backbone nodes $M_j$ 220 through 240 (S150). The key request message contains the ID $ID_A$ of the new node A 250 and the certificate $Proof_A$ used to verify the ID. In the event of the presence of the session key $SK_A$, the key request message may further contain the session key $SK_A$.

The backbone nodes $M_j$ 220 through 240, verify the new node A 250 using the certificate $Proof_A$ (S155) when receiving the key request message. In doing so, the backbone nodes $M_j$ 220 through 240 determine the presence or the absence of the session key $SK_A$ allocated to the new node A 250 from the initial backbone node $M_1$ 210.

When succeeding in verifying the new node A 250 and determining the presence of the session key $SK_A$ pre-allocated to the new node A 250, the backbone nodes $M_j$ 220 through 240 send to the new node A 250 the key part $P_j$ containing the partial keys, which are encrypted with the encrypt key $K_A$, corresponding to the common key index of the backbone nodes $M_j$ 220 through 240 and the new node A 250, and the second intermediate values $\hat{S}_i$ corresponding to the common key index (S160). The key part $P_j$ transmitted from the backbone nodes $M_j$ 220 through 240 to the new node A 250 is expressed as Equation 4.

$$P_j = \{E_{K_A}(k_i), \hat{S}_i, i \in I_{M_j} \cap I_A\} \quad \text{[Equation 4]}$$

In Equation 4, $P_j$ is the key part transmitted from the backbone nodes $M_j$ 220 through 240, $E_{K_A}(k_i)$ is the encrypted partial key corresponding to the common key index of the backbone nodes $M_j$ 220 through 240 and the new node A 250, and $\hat{S}_i$ is the second intermediate value corresponding to the common key index of the backbone nodes $M_j$ 220 through 240 and the new node A 250.

The new node A 250 receives the key part $P_j$ from the backbone nodes $M_j$ 220 through 240 (S165). The new node A 250 repeats the operations S150 through S165 until it receives the key part corresponding to its key index $I_A$. By means of the index of the second intermediate value in the received key part, the new node A 250 can determine whether the received key part is the key part corresponding to its key index.

Following the aforementioned example where the key index $I_A$ of the new node A 250 is $\{2,3,5\}$, the new node A 250 receives the key part $P_1$ containing $\{3,5\}$ its key index $I_A$ from the initial backbone node $M_1$ 210 (S150). The new node A 250 repeats the operations S150 through S165 until it receives the rest key index $I_A$ $\{2\}$ from the backbone nodes $M_j$ 220 through 240.

Next, the new node A 250 generates a decryption key $K'_A$ using the second intermediate value contained in the received key part (S170).

In particular, when receiving all of the key parts containing the second intermediate value corresponding to its key index $I_A$ and the encrypted partial keys, the new node A 250 generates the decryption key $K'_A = H(\hat{S}_2\|\hat{S}_3\|\hat{S}_5)$ by substituting a second concatenated value $\hat{S}_2\|\hat{S}_3\|\hat{S}_5$, which is acquired by concatenating the second intermediate value $\{\hat{S}_2, \hat{S}_3, \hat{S}_5\}$ contained in the received key parts, to the hash function H. The decryption key $K'_A$ is generated based on Equation 5.

$$K'_A = H\left(\underset{i \in I_A}{\|} \hat{S}_i\right) \quad \text{[Equation 5]}$$

In Equation 5, $K'_A$ is the decryption key, $I_A$ is the key index of the new node A 250, $\hat{S}_i$ is the second intermediate value, and H is the hash function.

Next, the new node A 250 decrypts the encrypted partial key $E_{K_A}(k_i)$ with the decryption key $K'_A$ (S175).

By decrypting the encrypted partial keys $E_{K_A}(k_2)$, $E_{K_A}(k_3)$, and $E_{K_A}(k_5)$ corresponding to its key index $I_A$ with the decryption key $K'_A$, the new node A 250 acquires key sets $k_2$, $k_3$, and $k_5$ corresponding to its key index $I_A$ (S180).

In general aspects described herein, the lightweight key distribution scheme is limited to the case where the new node joins the network for ease of understanding, but is not limited to this case. If one of the nodes in the network is determined to be a bad node and the other nodes hold the partial keys included in the key set allocated to the bad node, they can delete the corresponding partial keys and acquire new partial keys in place of the deleted partial keys using the lightweight key distribution method.

As set forth above, if a new node joins the wireless network, the key set, that is, the secure keys can be allocated to the new node using its ID while the key sets allocated to the existing nodes of the network are retained.

The examples described herein can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, functional programs, codes, and code segments for accomplishing general aspects described herein can be easily construed as within the scope of the invention by programmers skilled in the art.

While some examples have been shown and described, it will be understood by those skilled in the art that various changes in form and details may be made therein without departing from the spirit and scope of the examples described herein as defined by the appended claims and their equivalents.

What is claimed is:

1. A lightweight key distribution method for a backbone node of a wireless network, the method comprising:
   receiving a connection request message from a new node intending to join the wireless network;
   sending an identification (ID) to allocate to the new node and a certificate to verify the ID to the new node as a response to the receiving of the connection request message;
   receiving a key request message from the new node, the key request message including the allocated ID and the certificate;
   generating a session key as a result of the receiving of the key request message;
   calculating a second intermediate value by applying a first concatenated value to a hash function, the first concatenated value being acquired by concatenating the session key and a first intermediate value that corresponds to respective partial keys included in a key pool;
   generating an encryption key using the calculated second intermediate value, the generating of the encryption key comprising:
      extracting a common key index from a key index of the backbone node; and
      applying a second concatenated value to a hash function, the applying of the second concatenated value comprising acquiring the second concatenated value, the acquiring of the second concatenated value comprising concatenating the calculated second intermediate value corresponding to the extracted common key index;
   encrypting a partial key corresponding to the common key index with the generated encryption key, the common key index including commonalities existing between the key index of the backbone node and a key index of the new node; and
   sending a key part that includes the encrypted partial key and the second intermediate value to the new node.

2. The lightweight key distribution method of claim 1, further comprising:
   broadcasting the allocated ID, the certificate, and the session key to other backbone nodes of the wireless network,
   wherein the generating of the session key comprises:
      verifying the ID of the new node using the certificate; and
      generating the session key if the verifying of the ID is successful.

3. The lightweight key distribution method of claim 1, wherein the first intermediate value is generated using one of a hash function and a random function.

4. The lightweight key distribution method of claim 1, wherein:
   the connection request message and the key request message are received directly from the new node by the backbone node; and
   the ID, the certificate, and the key part are sent directly to the new node by the backbone node.

5. A key acquisition method for a new node intending to join a wireless network, the method comprising:
   sending a connection request message to a backbone node of the wireless network;
   receiving, from the backbone node in response to the sending of the connection request message, an identification (ID) allocated from the backbone node and a certificate to verify the ID;
   sending a key request message including the allocated ID and the certificate to the backbone node;
   receiving a key part from the backbone node that includes an encrypted partial key and a second intermediate value, the encrypted partial key corresponding to a common key index that includes commonalities existing between a key index of the backbone node and a key index of the new node, the second intermediate value being generated based on an application of a first concatenated value to a hash function, the first concatenated value being based on a concatenation of a session key and a first intermediate value corresponding to respective partial keys included in a key pool, the encrypted partial key being encrypted using an encryption key that is generated by extracting the common key index from the key index of the backbone node, and applying a second concatenated value to a hash function, the applying of the second concatenated value comprising acquiring the second concatenated value, the acquiring of the second concatenated value comprising concatenating the second intermediate value corresponding to the extracted common key index;
   generating a decryption key using the second intermediate value; and
   decrypting the encrypted partial key with the decryption key.

6. The key acquisition method of claim 5, wherein the generating of the decryption key applies the second concatenated value to a hash function.

7. The key acquisition method of claim 5, wherein:
   the connection request message and the key request message are sent directly to the backbone node by the new node; and the ID, the certificate, and the key part are received directly from the backbone node by the new node.

8. The key acquisition method of claim 5, further comprising, prior to the generating of the decryption key:
sending a second key request message directly to other backbone nodes, the second key request message including the allocated ID and the certificate; and
receiving a second key part directly from the other backbone nodes, the second key part including the second intermediate value and a second encrypted partial key that corresponds to other common key indexes, other common key indexes respectively corresponding with the other backbone nodes and including commonalities existing between the key index of the new node and respective key indexes of the other backbone nodes, the second intermediate value corresponding to the other common key indexes,
wherein the generating of the decryption key comprises:
determining whether the key part or the second key part corresponds to a local key index; and
generating the decryption key using the second intermediate value received in the key part or the second key part depending on the correspondence of the key part or the second key part to the local key index.

9. A system for lightweight key distribution in a wireless network, the system comprising:
a backbone node of the wireless network, the backbone node comprising:
an identification sending unit to send, to a new node intending to join the wireless network, an identification (ID) to allocate to the new node and a certificate to verify the ID, the ID and the certificate being sent to the new node in response to a connection request message received from the new node;
a receiving unit to receive:
the connection request message from the new node; and
a key request message from the new node, the key request message including the allocated ID and the certificate;
a session key generator to generate a session key as a result of the receiving unit receiving the key request message;
a calculator to apply a first concatenated value to a hash function to calculate a second intermediate value, the first concatenated value being acquired by concatenating the session key and a first intermediate value that corresponds to respective partial keys included in a key pool;
an encryption key generator to:
generate an encryption key using the second intermediate value; and
encrypt a partial key corresponding to a common key index with the generated encryption key, the common key index including commonalities existing between a key index of the backbone node and a key index of the new node; and
a key sending unit to send a key part that includes the encrypted partial key and the second intermediate value to the new node,
wherein:
the encryption key generator comprises a key index extractor to extract the common key index from the key index of the backbone node; and
the encryption key generator generates the encryption key by applying a second concatenated value to a hash function, the second concatenated value being acquired by concatenating the second intermediate value corresponding to the common key index.

10. The system for lightweight key distribution in a wireless network of claim 9, wherein:
the backbone node further comprises a broadcasting unit to broadcast the ID, the certificate, and the session key to other backbone nodes of the wireless network; and
the session key generator is further to:
verify the ID of the new node using the certificate; and
generate the session key if the verifying of the ID is successful.

11. The system for lightweight key distribution in a wireless network of claim 9, wherein the backbone node further comprises an intermediate value generator to generate a first intermediate value using one of a hash function and a random function.

12. The system for lightweight key distribution in a wireless network of claim 9, wherein:
the identification sending unit sends the ID and the certificate directly to the new node;
the receiving unit receives the connection request message and the key request message directly from the new node; and
the key sending unit sends the key part directly to the new node.

13. A system for lightweight key acquisition in a wireless network, the system comprising:
a new node intending to join the wireless network, the new node comprising:
a identification receiving unit to receive, from a backbone node of the wireless network in response to a sending of a connection request message by the new node, an identification (ID) allocated from the backbone node and a certificate to verify the ID;
a sending unit to send:
the connection request message to the backbone node; and
a key request message to the backbone node, the key request message including the allocated ID and the certificate;
a key part receiver unit to receive a key part from the backbone node that includes an encrypted partial key and a second intermediate value, the encrypted partial key corresponding to a common key index, the common key index comprising commonalities existing between a key index of the backbone node and a key index of the new node, the second intermediate value being generated based on an application of a first concatenated value to a hash function, the first concatenated value being based on a concatenation of a session key and a first intermediate value corresponding to respective partial keys included in a key pool, the encrypted partial key being encrypted based on an encryption key that is based on an extraction of the common key index from the key index of the backbone node, and an application of a second concatenated value to a hash function, the application of the second concatenated value being based on a concatenation of the second intermediate value corresponding to the extraction of the common key index; and
a decryption key generator to:
generate a decryption key using the second intermediate value; and
decrypt the encrypted partial key with the decryption key.

14. The system for lightweight key acquisition in the wireless network of claim 13, wherein the decryption key generator is further to apply the second concatenated value to a hash function to generate the decryption key.

15. The system for lightweight key acquisition in a wireless network of claim 13, wherein:
the identification receiving unit receives the ID and the certificate directly from the backbone node;
the sending unit sends the connection request message and the key request message directly to the backbone node; and
the key part receiver unit receives the key part directly from the backbone node.

16. The system for lightweight key acquisition in the wireless network of claim 13, wherein:
the sending unit is further to send a second key request message directly to other backbone nodes prior to the generating of the decryption key, the second key request message including the allocated ID and the certificate;
the key part receiver unit is further to:
receive a second key part directly from the other backbone nodes, the second key part including the second intermediate value and a second encrypted partial key that corresponds to other common key indexes, other common key indexes respectively corresponding with the other backbone nodes and including commonalities existing between the key index of the new node and respective key indexes of the other backbone nodes, the second intermediate value corresponding to the other common key indexes; and
determine whether the key part or the second key part corresponds to a local key index; and
the decryption key generator is further to generate the decryption key using the second intermediate value received in the key part or the second key part depending on the correspondence of the key part or the second key part to the local key index.

17. A non-transitory computer-readable recording medium storing a program for lightweight key distribution in a wireless network, comprising:
a first set of instructions configured to control a backbone node of the wireless network to send, to a new node intending to join the wireless network, an identification (ID) to allocate to the new node and a certificate to verify the ID, the ID and the certificate being sent to the new node in response to a connection request message received from the new node;
a second set of instructions configured to control the backbone node to receive:
the connection request message from the new node; and
a key request message from the new node, the key request message including the allocated ID and the certificate;
a third set of instructions configured to control the backbone node to generate a session key as a result of the receiving of the key request message from the new node;
a fourth set of instructions configured to control the backbone node to calculate a second intermediate value by applying a first concatenated value to a hash function, the first concatenated value being acquired by concatenating the session key and a first intermediate value that corresponds to respective partial keys included in a key pool;
a fifth set of instructions configured to control the backbone node to:

generate an encryption key using the calculated second intermediate value, the generating of the encryption key comprising:
extracting a common key index from a key index of the backbone node; and
applying a second concatenated value to a hash function, the applying of the second concatenated value comprising acquiring the second concatenated value, the acquiring of the second concatenated value comprising concatenating the calculated second intermediate value corresponding to the extracted common key index; and
encrypt a partial key corresponding to the common key index with the generated encryption key, the common key index including commonalities existing between the key index of the backbone node and a key index of the new node; and
a sixth set of instructions configured to control the backbone node to send a key part that includes the encrypted partial key and the second intermediate value to the new node.

18. A non-transitory computer-readable recording medium storing a program for lightweight key acquisition in a wireless network, comprising:
a first set of instructions configured to control a new node intending to join the wireless network to receive, from a backbone node of the wireless network in response to a sending of a connection request message by the new node, an identification (ID) allocated from the backbone node and a certificate to verify the ID;
a second set of instructions configured to control the new node to send:
the connection request message to the backbone node; and
a key request message to the backbone node, the key request message including the allocated ID and the certificate;
a third set of instructions configured to control the new node to receive a key part from the backbone node that includes an encrypted partial key and a second intermediate value, the encrypted partial key corresponding to a common key index, the common key index comprising commonalities existing between a key index of the backbone node and a key index of the new node, the second intermediate value being generated based on an application of a first concatenated value to a hash function, the first concatenated value being based on a concatenation of a session key and a first intermediate value corresponding to respective partial keys included in a key pool, the encrypted partial key being encrypted using an encryption key that is generated by extracting the common key index from the key index of the backbone node, and applying a second concatenated value to a hash function, the applying of the second concatenated value comprising acquiring the second concatenated value, the acquiring of the second concatenated value comprising concatenating the second intermediate value corresponding to the extracted common key index;
a fourth set of instructions configured to control the new node to generate a decryption key using the second intermediate value; and
a fifth set of instructions configured to control the new node to decrypt the encrypted partial key with the decryption key.

* * * * *